US011646986B2

(12) United States Patent
Ix

(10) Patent No.: US 11,646,986 B2
(45) Date of Patent: May 9, 2023

(54) APPARATUS, METHOD AND COMPUTER PROGRAM PRODUCT FOR IDENTIFYING A MESSAGE OF INTEREST EXCHANGED BETWEEN NODES IN A NETWORK

(71) Applicant: Vocalink Limited, London (GB)

(72) Inventor: Sebastian Ix, London (GB)

(73) Assignee: Vocalink International Limited, London (GB)

( * ) Notice: Subject to any disclaimer, the term of this patent is extended or adjusted under 35 U.S.C. 154(b) by 0 days.

(21) Appl. No.: 17/549,518

(22) Filed: Dec. 13, 2021

(65) Prior Publication Data
US 2022/0200942 A1 Jun. 23, 2022

(30) Foreign Application Priority Data

Dec. 22, 2020 (GB) ...................... 2020372

(51) Int. Cl.
*H04L 51/216* (2022.01)
*G06Q 20/40* (2012.01)
(52) U.S. Cl.
CPC ....... *H04L 51/216* (2022.05); *G06Q 20/4016* (2013.01)
(58) Field of Classification Search
CPC ............. G06Q 20/4016; H04L 67/535
See application file for complete search history.

(56) References Cited

U.S. PATENT DOCUMENTS

2014/0230033 A1\* 8/2014 Duncan ................. G06F 21/32
726/7
2015/0161611 A1 6/2015 Duke et al.
(Continued)

FOREIGN PATENT DOCUMENTS

CN 107705126 2/2018
EP 1381986 9/2002
(Continued)

OTHER PUBLICATIONS

International Search Report and Written Opinion for PCT Application No. PCT/EP2021/082011 (dated Feb. 28, 2022).
(Continued)

*Primary Examiner* — Caroline H Jahnige
(74) *Attorney, Agent, or Firm* — Hovey Williams LLP

(57) ABSTRACT

An apparatus, method and computer program product is provided in accordance with embodiments of the disclosure, for identifying a message of interest exchanged between nodes in a network. The apparatus comprising circuitry configured to: receive information of nodes in a network, the information including at least a unique identifier of each node; receive information of messages which have been exchanged between the nodes, the information comprising at least the unique identifier of the nodes related to each exchange of messages; for each node, transform the information of messages which have been exchanged into an individual set of interactions comprising the unique identifiers of nodes the node has exchanged messages with; determine a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and identify a message as a message of interest when the message is exchanged between nodes having a level of mutual interaction below a predetermined threshold.

19 Claims, 7 Drawing Sheets

(56) References Cited

U.S. PATENT DOCUMENTS

| | | | |
|---|---|---|---|
| 2017/0140382 A1* | 5/2017 | Chari | G06Q 20/389 |
| 2018/0181962 A1 | 6/2018 | David et al. | |
| 2020/0034844 A1* | 1/2020 | Groarke | G06F 17/18 |
| 2020/0167787 A1* | 5/2020 | Kursun | H04L 67/306 |

FOREIGN PATENT DOCUMENTS

| | | |
|---|---|---|
| EP | 2689384 | 9/2012 |
| EP | 3716179 | 9/2020 |

OTHER PUBLICATIONS

UK Search Report for Application No. GB2020372.5 entitled Apparatus, Method and Computer Program Product for Identifying a Message of Interest Exchanged Between Nodes in a Network (dated Jun. 22, 2021).

* cited by examiner

APPARATUS, METHOD AND COMPUTER PROGRAM PRODUCT FOR IDENTIFYING A MESSAGE OF INTEREST EXCHANGED BETWEEN NODES IN A NETWORK

CROSS REFERENCE TO RELATED APPLICATIONS

This application claims priority to United Kingdom Application No. 2020372.5, filed Dec. 22, 2020, which is incorporated herein by reference in its entirety

BACKGROUND

Field of the Disclosure

The field of the present disclosure relates to an apparatus, method and computer program product for identifying a message of interest exchanged between nodes in a network.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In recent years, there has been a significant increase in the use of online and electronic banking That is, consumers now frequently use personal computing equipment (such as a personal computer or a mobile device) in order to connect to a network (such as the internet) to control operations related to their bank account. These operations may include conducting a transaction to transfer funds from a first account to another account within the banking network, for example.

However, despite the convenience of online and electronic banking, banking fraud and scamming is becoming an ever increasing problem.

In a typical fraud or scam, a perpetrator of fraud (i.e. a fraudster) will illegally obtain funds from a victim's bank account. In some situations, this may be via a "phishing" or "malware" attack, where access to the victim's banking accounts or facilities is obtained. For example, a perpetrator of a fraud or scam may access and control a victim's account in order to deceptively obtain or disperse funds from the victims account.

Moreover, in some situations, a legitimate account may become involved in illicit activity. For example, the owner of the account may themselves be persuaded (wittingly or unwittingly) into performing certain fraudulent or money laundering activities using an account which has been legitimately established (such as a personal banking account). Fraudulent, or potentially fraudulent, activity performed with a legitimate account can be very technically challenging to identify during investigations into fraudulent activity.

Indeed, banking networks are very complex and comprise a very large number of individual accounts. Moreover, the number of transactions between the accounts in the banking network can be very high. In an economy such as that of the United Kingdom, the number of transactions occurring between accounts could reach a rate of around 300 transactions per second, or sometimes even more than this. Owing to the number of transactions and complexity of the banking network, efficient and reliable detection of fraudulent activity and/or fraudulent accounts becomes very difficult to achieve.

It is an aim of the present disclosure to provide a technical solution to address these issues.

SUMMARY

In a first aspect of the present disclosure, an apparatus for identifying a message of interest exchanged between nodes in a network is provided, the apparatus comprising circuitry configured to: receive information of nodes in a network, the information including at least a unique identifier of each node; receive information of messages which have been exchanged between the nodes, the information comprising at least the unique identifier of the nodes related to each exchange of messages; for each node, transform the information of messages which have been exchanged into an individual set of interactions comprising the unique identifiers of nodes the node has exchanged messages with; determine a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and identify a message as a message of interest when the message is exchanged between nodes having a level of mutual interaction below a predetermined threshold.

In a second aspect of the present disclosure a method of identifying a message of interest exchanged between nodes in a network is provided, the method comprising: receiving, using circuitry, information of nodes in a network, the information including at least a unique identifier of each node; receiving, using circuitry, information of messages which have been exchanged between the nodes, the information comprising at least the unique identifier of the nodes related to each exchange of messages; for each node, transforming, using circuitry, the information of messages which have been exchanged into an individual set of interactions comprising the unique identifiers of nodes the node has exchanged messages with; determining, using circuitry, a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and identifying, using circuitry, a message as a message of interest when the message is exchanged between nodes having a level of mutual interaction below a predetermined threshold.

In a third aspect of the present disclosure, a computer program product comprising computer readable instructions which, when the instructions are implemented by a computer, cause the computer to perform a method of identifying a message of interest exchanged between nodes in a network is provided, the method comprising: receiving information of nodes in a network, the information including at least a unique identifier of each node; receiving information of messages which have been exchanged between the nodes, the information comprising at least the unique identifier of the nodes related to each exchange of messages; for each node, transforming the information of messages which have been exchanged into an individual set of interactions comprising the unique identifiers of nodes the node has exchanged messages with; determining a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and identifying a message as a message of interest when the message is exchanged between nodes having a level of mutual interaction below a predetermined threshold.

According to embodiments of the disclosure, a message of interest exchanged in a network of nodes can be efficiently and reliably detected. In particular, fraudulent, or potentially fraudulent messages exchanged within the network can be identified from amongst a stream of messages exchanged within the network. This enables a significant reduction in the number of messages which must be further investigated in order to identify fraudulent activity. In particular, computationally expensive processing required to investigate instances of potential fraud can be performed only on messages which have been identified as messages of interest from amongst the messages exchanged within the network. This leads to improvements in processing efficiency when detecting fraudulent activity and fraudulent nodes in a network.

Of course, it will be appreciated that the present disclosure is not limited to the above identified technical effects. Rather, other technical effects will be apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BREIF DESCRITPION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
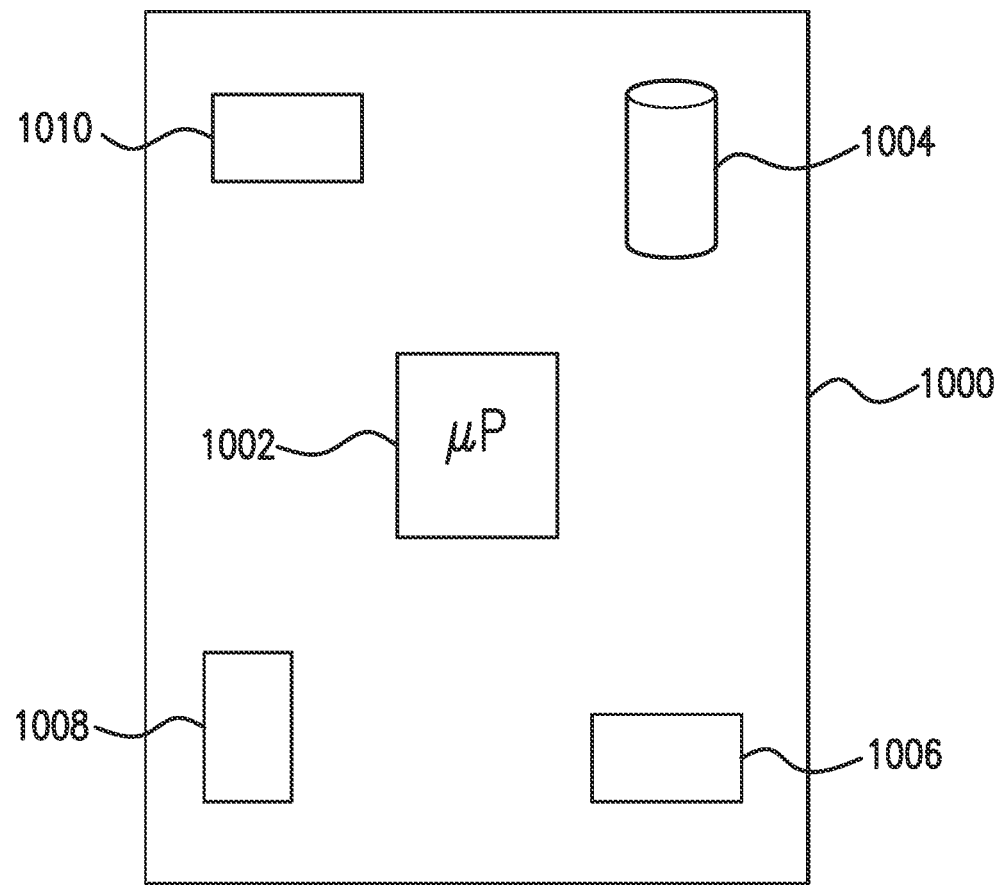
FIG. 1 illustrates an apparatus in accordance with embodiments of the disclosure.

Referring now to the drawings, wherein like reference numerals designate identical or corresponding parts throughout the several views.

FIG. 1 illustrates an apparatus in accordance with embodiments of the disclosure. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. More generally, the apparatus 1000 is a data processing apparatus.

The processing circuitry 1002 may be a microprocessor carrying out computer instructions or may be an Application Specific Integrated Circuit. The computer instructions are stored on storage medium 1004 which may be a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally connected to the processor circuitry 1002, is a user input unit 1008. The user input unit 1008 may be a touch screen or may be a mouse or stylus type input device. The user input 1008 may also be a keyboard or any combination of these devices. Furthermore, in some examples, the user input unit 1008 may also be a voice input device (such as a microphone device or the like) which is configured to receive sounds (such as a spoken command or the like) as input. Indeed, any form of input device may be used insofar as that device enables a user to provide instruction or other forms of input to the apparatus 1000.

Communication circuitry 1010 is also coupled to the processing circuitry 1002. The communication circuitry 1010 may provide a connection to a Local Area Network or a Wide Area Network such as the Internet or a Virtual Private Network or the like. For example, the communication circuitry 1010 may be connected to infrastructure allowing the processor circuitry 1002 to communicate with other devices or infrastructure equipment in order to obtain or provide relevant data. For example, the communication circuitry 1010 may enable the apparatus 1000 to communicate with financial institutions in a banking network or the like. The communication circuitry 1010 may therefore be behind a firewall or some other form of network security. This improves security of the apparatus 1000 and the data which is processed by that apparatus.

Additionally coupled to the processing circuitry 1002, is a display device 1006. The display device, although shown integrated into the apparatus 1000, may be separate to the apparatus 1000 and may be an electronic display (e.g. liquid crystal display (LCD) or the like) or some kind of device allowing the user to visualise the operation of the system. In addition, the display device 1006 may be a printer or some other device allowing relevant information generated by the apparatus 1000 to be viewed by the user or by a third party.

Figure 2:
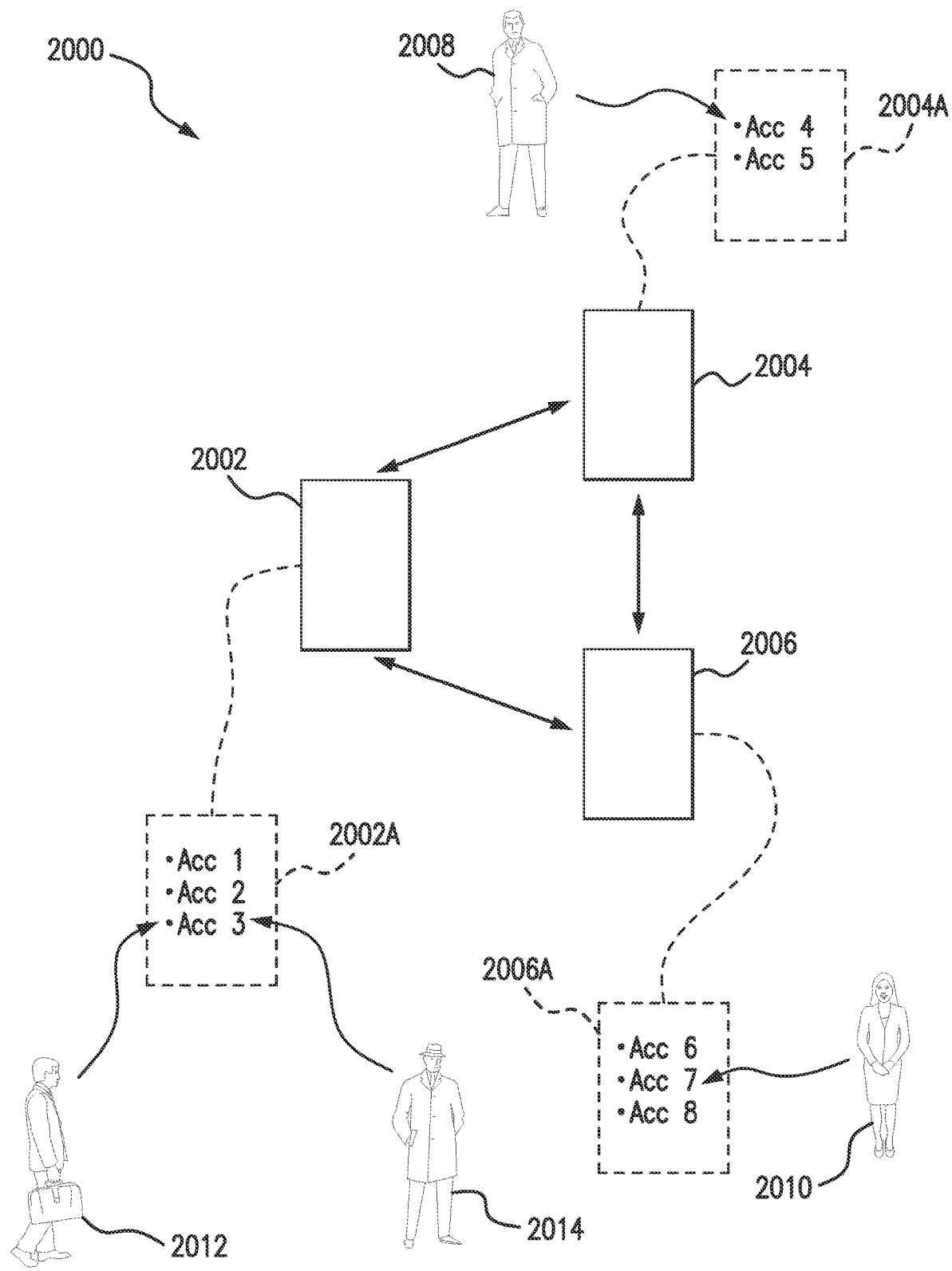
FIG. 2 illustrates an example situation to which embodiments of the disclosure may be applied.

Turning now to FIG. 2, an example situation to which embodiments of the disclosure may be applied is illustrated.

In this example, a number of financial institutions (e g banking institutions) 2002, 2004 and 2006 are shown. Together, these financial institutions 2002, 2004 and 2006 provide accounts which form part of the network of accounts 2000. Each of the financial institutions in this example is connected to a network (such as a banking network) via which messages can be exchanged between the financial institutions.

A number of accounts are associated with each of the financial institutions. For example, a number of accounts 2002A, including Account 1, Account 2 and Account 3, are associated with financial institution 2002. Likewise, accounts 2004A are associated with financial institution 2004 while accounts 2006A are associated with financial institution 2006. These accounts may, in this example, be bank accounts. When the account is a bank account, for example, the account may be used in order to store funds belonging to the owner of the account.

These accounts can then be used in order to exchange digital messages in order to transfer funds across the network of accounts. That is, by exchanging messages across the network, an account in the network may interact with one or more other accounts in the network (belonging to either the same financial institution and or one or more other financial institutions in the network).

Consider now a specific example described with reference to Account 4, held with financial institution 2004. Person 2008 is the owner of Account 4. In this example, person 2008 may wish to transfer a portion of the funds held in their account across the network to Account 7 (which is owned by person 2010). In order to conduct the transfer, person 2008 may provide instructions to financial institution 2004 authorising a transfer of funds between Account 4 and Account 7. When successful authentication has been provided (such as a passcode or the like), financial institution 2004 will conduct a transfer of funds (through an exchange of messages) with financial institution 2006 over the network. In this way, person 2008 may transfer funds to person 2010. Person 2010 may then withdraw the funds (from an Automated Teller Machine or the like) or use the funds in a further interaction with one or more of the other bank accounts in the network.

As noted above, the transfer of funds from one account to another account requires successful authentication of the person who wishes to conduct the transfer. Indeed, a number of security protocols may be implemented in order to verify that the person instructing an operation (such as a transfer) is the legitimate owner of the account who has the authority to instruct said operation.

Nevertheless, despite these security protocols, the accounts in the network may be vulnerable to one or more of a "phishing" or "malware" attack (or indeed, some other type of attack), where fraudulent access to the victim's banking accounts or facilities is obtained. An example of a phishing attack is where a fraudster (such as person 2014 in this example) convinces a victim (such as person 2012) to provide secret information regarding the account (such as a password or the like) which can subsequently be used in order to gain unauthorised access to the victim's account. Once a fraudster has gained unauthorised access to the victim's account, they may control the victim's account in order to deceptively obtain or disperse funds from the victims account.

In the example of FIG. 2 of the present disclosure, once the fraudster 2014 has gained access to Account 3 (using secret information obtained fraudulently from person 2012) the fraudster 2014 may use Account 3 to engage in a plethora of illicit activity (including fraudulent transfer of funds across the network, for example). For example, the fraudster 2014 may engage in exchanging a series of messages to transfer funds from the victim's account into one or more other accounts which are operated by the fraudster. The fraudster can then withdraw this money from these other accounts (using an ATM for example).

In fact, the longer the fraudulent activity continues without detection, the more difficult it becomes to recover funds which have been stolen as the fraudster 2014. In particular, the fraudster may use several techniques to obfuscate the dispersion of the funds across the network. Therefore, it becomes very important to identify fraudulent activity in the network (such as a fraudulent, or potentially fraudulent, exchange of messages) as quickly and efficiently as possible in order to disrupt the fraudsters illicit activity and to recover the funds which have been stolen from the victim.

However, it can be very difficult to identify fraudulent activity (such as money laundering) which occurs using an account which has been legitimately established in the network. For example, Account 7 may have been established by person 2010 for legitimate purposes (such as for transferring funds to person 2012). However, person 2010 may be persuaded (wittingly or unwittingly) to perform certain money laundering activities using their legitimate account, Account 7 (which may be, for example, their personal banking account). Use of the legitimate account in order to perform the money laundering activity integrates the illegitimate behaviour amongst legitimate transfers, making it very difficult and computationally challenging to identify the illegitimate behaviour and recover funds linked to the money laundering activity.

Moreover, owing to the size of the network of accounts, and the number of transactions which are performed, it can be very computationally demanding to perform these investigations. Significant numbers of fraudulent transfers and fraudulent accounts may therefore go undetected.

As such, it is desired that a technical solution to the above identified issues is provided. As such, the inventors have realised an apparatus for identifying messages of interest exchanged between nodes in a network.

<Apparatus>

Figure 3:
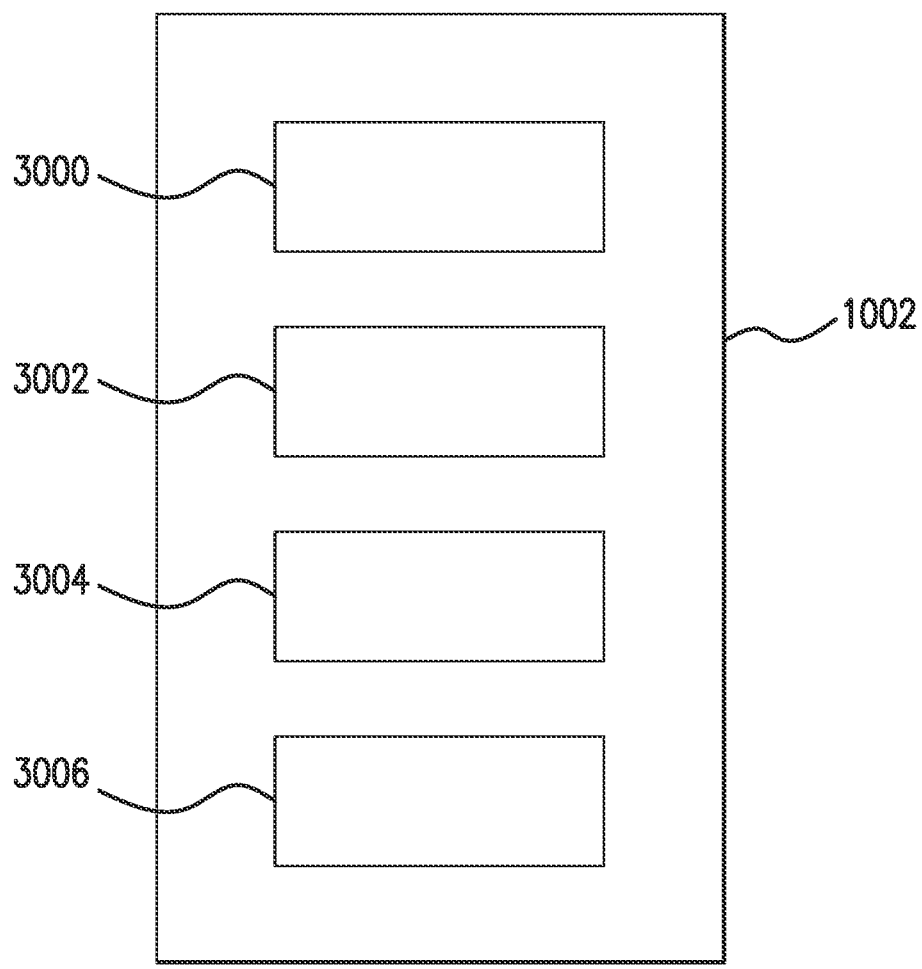
FIG. 3 illustrates an apparatus in accordance with embodiments of the disclosure.

FIG. 3 illustrates a specific example configuration of an apparatus for identifying messages of interest exchanged between nodes in a network in accordance with embodiments of the disclosure. In this example, the apparatus may, itself, be an apparatus such as apparatus 1000, where the processing circuitry 1002 is configured according to the example configuration illustrated in FIG. 3 of the present disclosure.

In this example, a receiving unit 3000, a transforming unit 3002, a determining unit 3004 and an identifying unit 3006 are provided.

The receiving unit 3000 is configured to receive information of nodes in a network, the information including at least a unique identifier of each node. Furthermore, the receiving unit 3000 is configured to receive information of messages which have been exchanged between the nodes, the information comprising at least the unique identifier of the nodes related to each exchange of messages. Then, for each node, the transforming unit 3002 is configured to transform the information of messages which have been exchanged into an individual set of interactions comprising the unique identifiers of nodes the node has exchanged messages with.

Once the transforming unit 3002 has transformed the information into the individual sets of interactions, the determining unit 3004 is configured to determine a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node.

Finally, the identifying unit 3006 is configured to identify a message as a message of interest when the message is exchanged between nodes having a level of mutual interaction below a predetermined threshold.

Further details regarding the apparatus for identifying messages of interest exchanged between nodes in a network are described with reference to FIGS. 4A, 4B and 5 of the present disclosure.

<Receiving Unit>

As described with reference to FIG. 3 of the present disclosure, the receiving unit 3000 is configured to receive information of nodes in a network and information of messages exchanged between those nodes.

The information of nodes in the network includes, at least, information including at least a unique identifier of each node. This enables the receiving unit 3000 to establish an updated understanding of the network. Consider the example described with reference to FIG. 2 of the present disclosure. Here, a number of unique accounts (nodes) have been established in the network, being associated with each of financial institutions 2002, 2004 and 2006 respectively. Accordingly, in this example, the receiving unit 3000 may receive information including a unique identifier of each of these accounts. In the specific example where the accounts are bank accounts, the unique identifier of each account may include a bank account number and/or sort code of each of the accounts. However, more generally, any unique identifier (such as an account number) associated with the accounts in the network may be used as the unique identifier of each node.

The information including at least a unique identifier of each node may be stored by the receiving unit 3000. This may be an internal storage unit (such as storage medium 1004 described with reference to FIG. 1 of the present disclosure). Alternatively, it may be an external storage unit held in an external device such as a server or the like. The present disclosure is not particularly limited in this regard, insofar as the information which has been received can be accessed by apparatus 1000 as required.

While a limited number of accounts have been illustrated in FIG. 2 of the present disclosure, the present disclosure is not particularly limited in this regard. That is, there may be many more accounts than those accounts shown in FIG. 2 of the present disclosure. Moreover, it will be appreciated that the number of accounts in the network may be dynamic and change over time. Indeed, new accounts may be opened in the network (such as if a person requires an additional account and/or if a new person, who previously held no account, wishes to open an account). Conversely, accounts may also be closed in some situations. Therefore, the number of active accounts in the network may decrease. This may be the case when a person no longer requires the use of the account to transfer funds across the network for example.

Therefore, as the number of accounts in the network may be dynamic, and thus change over time (either by increasing or decreasing), the receiving unit 3000 may receive updates regarding the unique identifiers of accounts in the network. These updates may be received periodically (at set intervals of time) or may occur when new accounts have been opened and/or when older accounts have been closed. In this manner, the apparatus 1000 may obtain the most relevant information regarding the active accounts (being those accounts which have been opened, but not closed) within the network.

In some examples, the information which has been received may relate to a certain subset of accounts which are active in the network. That is, it may be, in some examples, that a person (such as an investigator) wishes to gain understanding (i.e. identify messages of interest) of messages which have been exchanged amongst a certain subset of the accounts in the network (such as all accounts which belong to financial institution 2002, for example). However, in other examples, the information received will relate to all the accounts which are active within the network.

The receiving unit 3000 may further be configured to receive information of messages which have been exchanged between nodes, the information comprising at least the unique identifier of the nodes related to each exchange of messages. Consider the example of FIG. 2 of the present disclosure, for example, where the nodes are accounts in the network and the messages are transactions which are used in order to transfer funds between accounts in the network. Here, in this example, the information of messages which have been exchanged between nodes in the network may include information of all previous messages (i.e. all previous transactions) which have occurred between the accounts in the network.

The information of each message which has been exchanged may include at least the unique identifiers (e.g. the bank account number and/or sort code) of each account which is involved in that given exchange of messages. If an message is exchanged between Account 1 and Account 4 in the example of FIG. 2, the information of the message which has been exchanged may include the unique identifier of Account 1 and the unique identifier of Account 4. From this information, the apparatus 1000 can determine that an exchange of messages occurred between Account 1 and Account 4.

In some examples, the information of each message which has been exchange may also include further information regarding the message which has been exchanged. This further information may, for example, include information such as a value of the message (such as an amount of funds which have been exchanged) a time of the message (such as the time at which the exchange of messages was authorised and/or a time at which the exchange of messages occurred). Moreover, the information may indicate a directionality of the exchange of messages (such as which of the associated accounts sent or received the message).

In examples, the information of the messages which have been exchanged may include only the messages which have been exchanged within a predetermined time period. That is, in some examples, the information of the messages which have been exchanged may be limited only to the most recent exchange of messages (being those messages which have been exchanged in a time period such as a number of months, or years, prior to the present time). This may ensure that older information (regarding an exchange of messages which occurred a long time previously) has less impact on the identification of a messages of interest. However, in other examples, a complete set of messages (transactions) may be received. This requires a full network view for a time window that covers the account's full previous activities (such as a time window since the account has been opened). This may ensure that the most complete view of the exchange of messages in the network is used in the identification of messages of interest, thus further improving the accuracy and reliability of the identification of a message of interest.

In some examples, the information regarding the messages which have been exchanged may be received only for the subset of nodes in the network which have been identified in the information of nodes in the network. This enables specific investigation of a certain subset of the nodes in the network for messages of interest.

Furthermore, in some examples, the information regarding the messages which have been exchanged may be received at a certain time (such as when a person, such as an investigator, requests that messages of interest which have been exchanged are identified). However, in other examples, the information regarding the messages which have been exchanged may be received at predetermined time intervals. Alternatively, in other examples, the information regarding the messages which have been exchanged may be updated as new messages are exchanged in the network. In this manner, a stream of messages (such as the stream of transactions between accounts described with reference to FIG. 2 of the present disclosure) may be consumed by apparatus 1000 in order to form a complete picture of the messages which have been exchanged between nodes in the network.

As described for the information of the nodes in the network, the information of the messages which have been exchanged between the nodes in the network may be stored in an internal or external storage unit by apparatus 1000. However, the present disclosure is not particularly limited in this regard, provided that apparatus 1000 is able to access the information of the messages which have been exchanged between the nodes in the network as required.

In this manner, the receiving unit 3000 receives information regarding the nodes in the network and the messages which have been exchanged between those nodes.

<Transforming Unit>

As described with reference to FIG. 3 of the present disclosure, the transforming unit 3002 is configured to transform the information of messages which have been exchanged into an individual set of interactions comprising the unique identifiers of nodes the node has exchanged messages with. In other words, the transforming unit 3002 transforms the information of messages which have been exchanged such that, for each account, a set (or list) of other accounts in the network which the account has interacted with is produced. The format of this set of accounts is not particularly limited insofar as it provides a record of the other accounts in the network which a given account has previously interacted with.

It will be appreciated that the type and nature of the interactions will depend, at least in part, on the type of nodes included in the network and the type of messages which are exchanged between those nodes. However, in the example described with reference to FIG. 2 of the present disclosure for example (where the nodes are individual accounts, and the messages are transactions between those accounts) an interaction may be formed when an account exchanges funds with another account in the network.

In some examples, the set of interactions which is produced identifies only the accounts with which the account has interacted. That is, regardless of the number of messages which are exchanged between a first and second account (such as Account 1 and Account 3) the set of interactions for the first account shall include only a single entry of the second account (showing that the first account has interacted with the second account). In other words, for each other account which the first account has exchanged messages, a single entry of the unique identifier of that other account may appear in the set of interactions of the first account.

However, in other examples, a number of entries for a second account may be produced in the set of interactions for a first account depending on the number of times the first and second account have interacted with each other (alternatively, additional information within the set of interactions may indicate the number of interactions which have occurred between the two accounts).

The set of interactions produced in this manner detail each individual account in the network a given account has interacted with (by paying money to or receiving money from, for example).

Figure 4A:
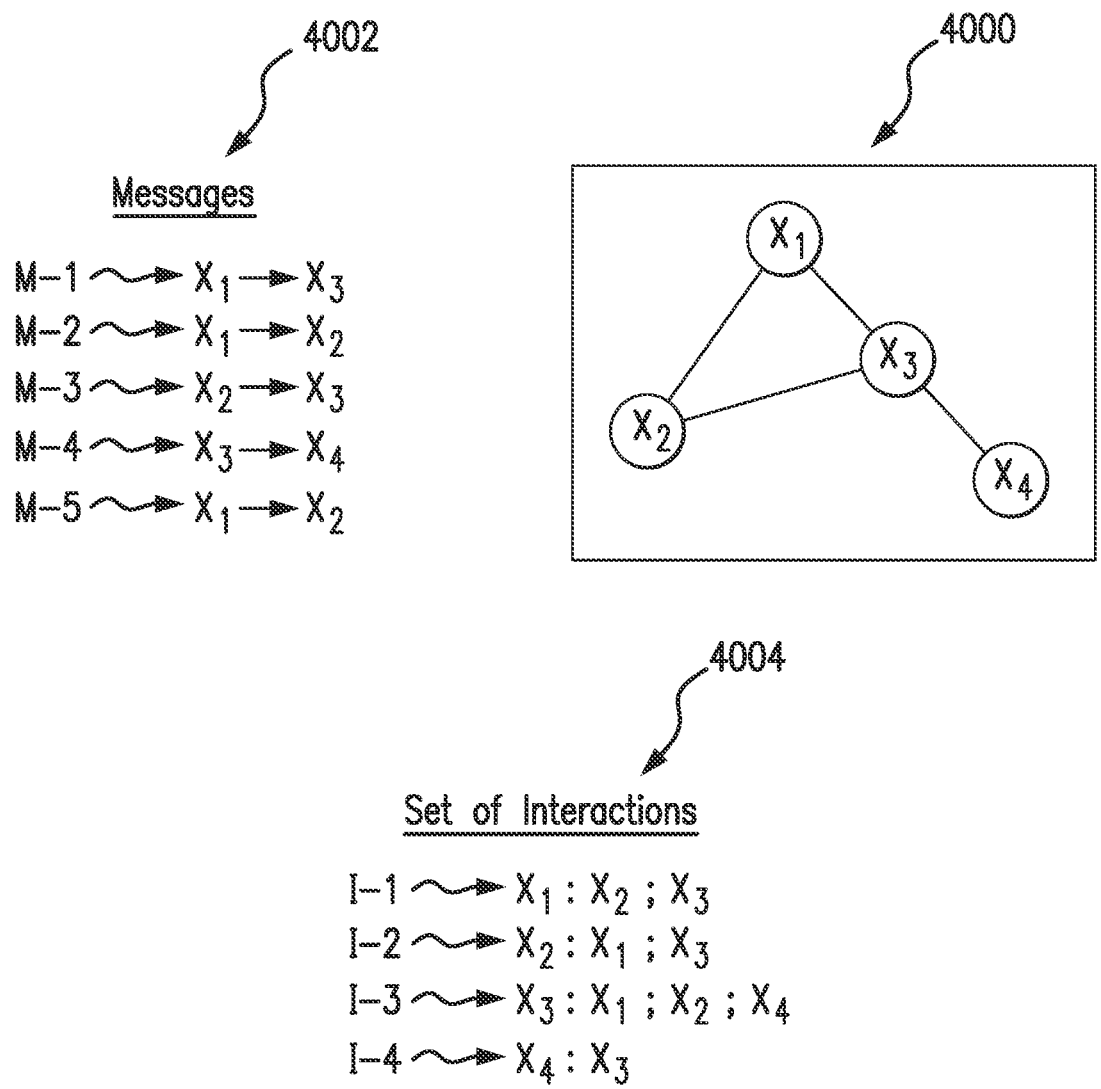
FIG. 4A illustrates an exchange of messages in a network of nodes in accordance with embodiments of the disclosure.

FIG. 4A illustrates an exchange of messages in a network of nodes in accordance with embodiments of the disclosure. In this example, a set of four nodes X1, X2, X3 and X4 are shown in a network of nodes 4000. Messages 4002 are exchanged between these nodes in the network 4000. The transforming unit 3002 of apparatus 1000 is configured to produce a set of interactions 4004 for each of the accounts X1, X2, X3 and X4.

In this example, information regarding the nodes in the network (i.e. the unique identifiers of each of X1, X2, X3 and X4) and the messages 4002 exchanged between those nodes is received by the receiving unit 3000 of apparatus 1000. This enables the apparatus 1000 to understand the configuration of the nodes in the network and the messages which have been exchanged between the nodes in the network. Using this information, the transforming unit 3002 of apparatus 1000 produces a set of interactions 4004 for each of the nodes in the network (i.e. each of X1, X2, X3 and X4) detailing the other nodes in the network which that node has interacted with.

Specifically, the receiving unit 3000 receives information of a series of five messages (M-1, M-2, M-3, M-4 and M-5) which have been exchanged between the nodes X1, X2, X3 and X4 in the network. Here, message M-1 relates to an exchange of messages between X1 and X3, message M-2 and message M-5 relate to an exchange of messages between node X1 and X2, message M3 relates to an exchange of messages between X2 and X3, and message M-4 relates to an exchange of messages between nodes X-3 and X-4.

Once this information has been received (or, alternatively, in some examples, in parallel to the reception of this information by the receiving unit 3000) the transforming unit 3002 is configured to transform the messages which have been exchanged in order to produce a set of interactions for each node (detailing the nodes which that node has interacted with).

Starting with node X1, the transforming unit 3002 of the present disclosure therefore identifies that the node X1 is involved in three of the messages which have been received: M-1, M-2 and M-5. Of these messages, a single message, M-1, relates to an exchange of messages between node X1 and node X3. Therefore, the unique identifier of node X3 is added to the set of interactions I-1 for node X1. Furthermore, the other node which node X1 has interacted with (through an exchange of messages) is node X2. This is through an interaction with node X1 in messages M-1 and M-5. Accordingly, in this example, a single entry of the unique identifier of node X2 is also added to the set of interactions I-1 for node X1 by the transforming unit. At this stage, node X1 has not exchanged messages with any other node in the network. Therefore, the transforming unit 3002 may mark the set of interactions I-1 of the first node X1 as complete.

Considering the node X2, the transforming unit 3002 of the present disclosure identifies that the node X2 is involved in three of the messages which have been received by the receiving unit 3000: M-2, M-3 and M-5. Of these messages, two messages, M-2 and M-5, relate to an exchange of messages with node X1. Therefore, the unique identifier of node X1 is added to a set of interactions I-2 for node X2. The other message, M-3, relates to an exchange of messages with node X3. Therefore, the transforming unit 3002 is configured to add the unique identifier of node X3 to the set of interactions I-2 for node X2. As X2 has exchanged no further messages with any other node in the network, the transforming unit 3002 may mark the set of interactions I-2 of the second node X2 as complete.

For node X3, the transforming unit 3002 identifies that the node X3 is involved in three of the messages which have been received (namely, messages M-1, M-3 and M-4). Of these messages, a single message, M-1, relates to an interaction (message exchange) with node X1. Accordingly, the unique identifier of node X1 is added to the set of interactions I-3 for node X3. Furthermore, a single message, M-3, relates to an interaction (message exchange) with node X2. Therefore, the unique identifier of node X2 is added to the set of interactions I-3 for node X3 by the transforming unit 3002. Finally, the third message M-4 relates to an exchange between node X3 and node X4 in the network. Therefore, node X3 has interacted with node X4. Accordingly, the unique identifier of node X4 is added to the set of interactions I-3 for node X3. Node X3 has exchanged no further messages with any other node in the network, so the transforming unit 3002 may mark the set of interactions I-3 of the third node X3 as complete.

Finally, considering node X4, the transforming unit 3002 identifies that the node X4 is involved in only a single message, M4, from amongst the messages 4002 which have been received by the receiving unit 3000 (being those messages exchanged between the nodes X1, X2, X3 and X4 in the network of nodes 4000). This messages, M4, relates to an exchange of messages with node X3. Therefore, the transforming unit 3002 adds the unique identifier of node X3 to the set of interactions I4 for node X4. As node X4 has exchanged no further messages, the transforming unit 3002 may mark the set of interactions I-4 of the node X4 as complete.

In this manner, the transforming unit 3002 transforms the set of messages 4002 which have been exchanged in the network of nodes 4000 into an individual set of interactions 4004 for each of the nodes X1, X2, X3 and X4, describing the unique identifiers of the other nodes in the network that node has interacted with.

Of course, it will be appreciated that the specific example of FIG. 4A is provided as an example of the processing performed by the transforming unit 3002 when producing the set of interactions for each node in the network. The present disclosure is not particularly limited to this example. Indeed, any suitable processing which produces an individual set of interactions for each node in the network may be applied by the transforming unit 3002 as required depending on the situation to which embodiments of the disclosure are applied.

For example, the number of nodes in the network and the number of messages which have been exchanged may be much larger than the numbers illustrated in this specific example. Moreover, a number of the steps performed by the transforming unit 3002 when producing the set of interactions for each node may be performed in parallel. That is, the transforming unit 3002 may produce each of the individual set of interactions I-1, I-2, I-3 and I-4 in parallel, for example. Moreover, the transforming unit 3002 may construct the set of interactions as the information of the message 4002 is received. Indeed, the transforming unit 3002 may continue to update the set of interactions (adding new unique identifiers to the set of interactions for a given node, for example) as new messages are exchanged within the network.

Once the individual set of interactions has been produced for a given node, the transforming unit 3002 may store the set of interactions in a storage unit (being either an internal or external storage unit, for example). However, the present disclosure is not particularly limited in this regard, provided that the information regarding the set of interactions which have been produced is accessible to apparatus 1000 at a later stage of processing (e.g. to the determining unit 3004) as required.

Moreover, as previously explained, the form of the set of interactions (i.e. the manner in which the information is stored) is not particularly limited in accordance with the present disclosure, provided that information regarding the unique identifiers of the other nodes in the network which a given node has interacted with (i.e. undergone an exchange of messages with) are accessible from the set of interactions which have been produced.

In this manner, the transforming unit 3002 is configured to produce a set of interactions for each node in the network.

<Determining Unit>

As described with reference to FIG. 3 of the present disclosure, the determining unit 3004 of apparatus 1000 is configured to determine a level of mutual interaction between nodes in the network using the individual set of interactions of each node.

The level of mutual interaction between nodes in the network indicates the strength of the previous interactions between two nodes in the network, based on messages which have been exchanged in the network. This information may be determined, by determining unit 3004, using the set of interactions which have been produced for each individual node in the network by the transforming unit 3002. The level of mutual interaction between two nodes in a network, based on the previous messages which have been exchanged, is an efficient indicator of the level of interest of a certain message which is and/or has been exchanged.

Consider, again, the example which has been described with reference to FIG. 2 of the present disclosure. In this example, the nodes in the network relate to accounts in the banking network. The messages which are exchanged relate to transactions used in order to transfer funds to other nodes in the network (such that the messages are transactions between the nodes). As previously explained, it can be very computationally challenging to identify a message of interest (such as a fraudulent or potentially fraudulent exchange of messages) from amongst all the messages that are exchanged in the network. However, the inventors have realised that the level of mutual interaction between two nodes can be an efficient and reliable mechanism to identify messages of interest (such as a fraudulent or potentially fraudulent transaction) in a network.

In particular, a legitimate account, embedded in the network, will undergo a series of message exchanges with other accounts in the network. These exchanges may relate to transfers of funds to and/or from other accounts in the network with which the legitimate account has a longstanding relationship (such as transfers of funds to friends or family members (e.g. parents, or the like) and/or transfers of funds between an employer and an employee or the like). Therefore, when a future transaction is made (through an exchange of messages) the future transaction is often made between accounts which have had a previous direct interaction (e.g. being an account funds were previously paid to and/or received from). These transactions can be considered as lower risk, as they relate to a transaction with an account with which a longstanding relationship has been established. Nevertheless, it will be appreciated that, in certain situations, a future transaction will be made with an account with which no previous transaction has been made. In these situations, it can be very difficult to establish a level of risk associated with the new transaction. That is, in some examples, the transaction transferring funds to a new account may have a legitimate purpose (such as transferring funds to a family member to whom the owner of the account has not previously transferred funds). However, in other examples, the transaction transferring funds to a new account may be indicative of illicit behaviour. This may, for example, be the case when a fraudster has gained unauthorised access to an account, and transfers funds from that account to a new account operated by the fraudster. It can be computationally very difficult to determine a level of risk for the new/future transaction in these situations.

However, analysis of the mutual interactions of two accounts provides an indicator of how strong a tie is between two accounts, even when those accounts have not directly interacted with each other at all in the past. That is, analysing the neighbourhood of both accounts (and the extent of overlap between these neighbourhoods) provides an efficient and reliable mechanism which can identify a message of interest from amongst the messages exchanged in the network, even when those accounts have had no previous direct interaction.

Specifically, even if two accounts have not directly interacted with each other in the past (through an exchange of messages) an account and its interactions (indicated by the set of interactions for that account) form the account's first degree neighbourhood (being all those accounts with which the account has had previous interactions). A mutual interaction with a third account can be a strong indicator that a new message between a first and second account is legitimate, even when the first and second account have not had any direct interaction with each other in the past. In contrast, a fraudulent (or potentially fraudulent transaction) most often does not exhibit any historic exchange of messages. Indeed, a fraudulent transaction usually relates to an exchange of messages between two accounts which neither have a direct relationship nor which have a mutual interaction (being a common interaction with a third account). Therefore, the strength of the mutual interactions between two accounts (based on previous exchange of messages) can be used as an efficient and reliable filter which can be used in order to identify messages of interest in a series of messages exchanged between nodes in a network.

A low level of mutual interaction is also observed in the situation where an owner of a legitimate account has been persuaded (wittingly or unwittingly) to use their account for illicit activity (such as money laundering or the like). That is, in these situations, the owner of the account often begins to transfer funds into accounts with which no previous relationship (or level of mutual interaction) has been established. As such, the level of mutual interaction can also be used as an efficient and reliable mechanism to identify messages of interest (having a high likelihood of being linked to illicit activity) in this type of example situation.

It will be appreciated that, in some situations, a legitimate message may be exchanged between two nodes which have a very low level of previous mutual interaction. However, this situation is quite rare. As such, use of the level of mutual interaction to identify messages of interest efficiently removes a large percentage of legitimate messages from consideration as messages of interest, while leaving only the messages which are most likely to be of higher risk for further investigation and/or further processing. Moreover, if a legitimate message is exchanged between two nodes that have a very low level of previous mutual interaction, and, subsequently, that message is determined to be a legitimate message, any further messages which are transferred between those two nodes will have a higher level of mutual interaction and likely not be identified as a message of interest (since those two nodes will have formed a direct relationship which will be considered by the determining unit 3006 of the present disclosure when determining the level of mutual interaction between nodes).

In the present disclosure, a message of interest may, in some examples, be considered as a high risk message or a message which shows strong likelihood of being a fraudulent, or potentially fraudulent, message (such as may occur when a fraudster gains unauthorised access to a third parties account and instructs transactions to accounts with which the victim has not previously made any payments to and/or received any payments from).

Figure 4B:
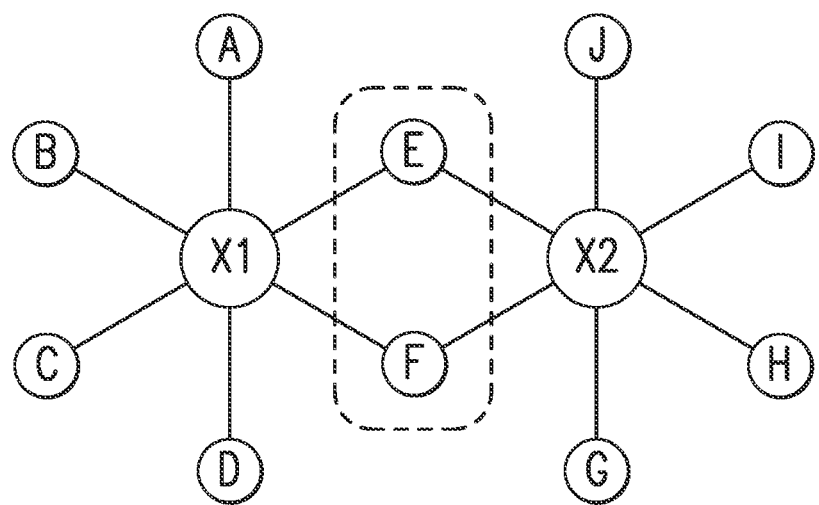
FIG. 4B illustrates an exchange of messages in a network of nodes in accordance with embodiments of the disclosure.

Consider the examples of FIG. 4B of the present disclosure. In this example, an exchange of messages in a network of nodes in accordance with embodiments of the disclosure is illustrated.

In this example, a new message has been received, being a message between a first node X1 and a second node X2 in a network. Analysis of the set of interactions for node X1 and node X2 show that no previous message has been exchanged between node X1 and node X2 in the network. Therefore, the direct interactions between node X1 and node X2 cannot be used in order to determine whether the new message is a message of interest (being a high risk new message, for example).

However, as noted above, the determining unit 3006 may access an individual set of interactions for each of nodes X1 and X2 (with the set of interactions for each node being produced by the transforming unit 3004 of apparatus 1000). These individual sets of interactions can be used in order to determine the level of mutual interaction between node X1 and X2 (even though no previous message has been exchanged between node X1 and X2).

In this example, node X1 has exchange previous messages with nodes A, B, C, D, E and F in the network. The unique identifiers of these nodes are listed in the set of interactions for node X1.

In contrast, node X2 has exchanged previous messages with nodes E, F, G, H, I and J in the network. The unique identifiers of these nodes are listed in the set of interactions for node X2.

Since the unique identifier of node E appears in the set of individual interactions for both of nodes X1 and X2, the determining unit 3006 can determine that nodes X1 and X2 have a mutual interaction through exchange of previous messages with node E. The presence of a mutual interaction with node E increases the level of mutual interaction which is determined for nodes X1 and X2.

Likewise, since the unique identifier of node F appears in the set of individual interactions for both of nodes X1 and X2, the determining unit 3006 can determine that nodes X1 and X2 have a mutual interaction through exchange of previous messages with node F. The presence of a mutual interaction with node F increases the level of mutual interaction which is determined for node X1 and X2.

Therefore, in some examples the determining unit 3006 is configured to determine the level of mutual interaction between nodes in the network using the individual set of interactions of each node, wherein a first node has a mutual interaction with a second node when the unique identifier of the second node is contained in the individual set of interactions of the first node (a previous direct interaction between nodes) and/or the unique identifier of a third node is contained in the individual set of interactions of each of the first and second node (a first degree neighbour overlap between the nodes in the network with which the first and second node have exchanged messages in the past).

Indeed, in some examples, the determining unit 3006 of apparatus 1000 may be configured to determine the level of mutual interaction such that the strength of the mutual interaction (i.e. the level of mutual interaction which is determined for a message between two nodes) increases as the number of individual instances of mutual interaction increases (i.e. as the degree of overlap between the neighbourhood of the two nodes, X1 and X2, increases).

However, the present disclosure is not particularly limited in this regard. Indeed, in some examples, a weighting may be applied to each of the mutual interactions, such that certain mutual interactions contribute more strongly to the level of mutual interaction between nodes. In fact, in some examples, the intersection of all set of interactions between the first node and the second node should be accounted for in order to determine the level of mutual interaction between nodes.

Figure 5:
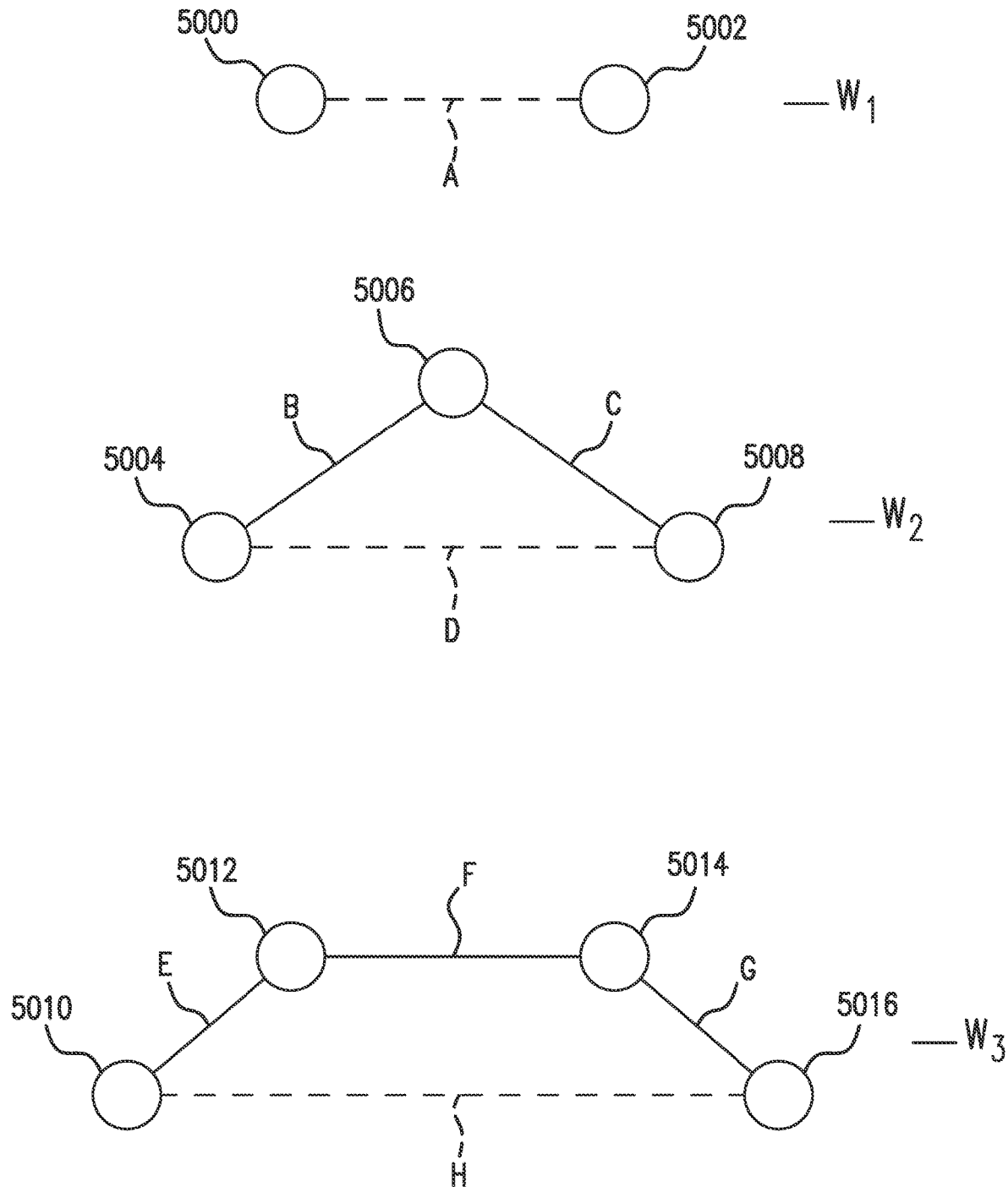
FIG. 5 illustrates an exchange of messages in a network of nodes in accordance with embodiments of the disclosure.

Consider the example of FIG. 5 of the present disclosure. In this example, a set of three different types of interactions between nodes in a network are shown.

The first of these interactions is an exchange of messages A between a first node 5000 and a second node 5002. This type of an exchange of messages is an example of a direct interaction between the first node 5000 and the second node 5008.

The second of these interactions is an example situation where a new message, D, is exchanged between nodes 5004 and 5008. Here, a previous message, B, has been exchanged between node 5004 and node 5006. Furthermore, a previous message, C, has been exchanged between node 5006 and node 5008. This type of an exchange of messages is an example of an indirect first degree mutual interaction between nodes 5004 and 5008.

The third example is a situation where a new message, H, is exchanged between a node 5010 and a node 5016. Here, a previous message E has been exchanged between node 5010 and node 5012. Likewise, a previous message, G, has been exchanged between node 5014 and 5016. Finally, a previous message F has been exchanged between node 5012 and node 5014. Therefore, the second degree neighbourhood of nodes for node 5010 overlaps with the second degree neighbourhood of node 5016 (through the mutual interaction of node 5012 and 5014 through previous message F). This third example situation is therefore an example of an indirect second degree mutual interaction between nodes 5010 and 5016. That is, in some examples, a first and second account may share a mutual interaction when the unique identifier of a fourth node is contained in the individual set of interactions of the first node, a fifth node is contained in the individual set of interactions of the second node, and the unique identifier of the fifth node is contained in the individual set of interactions of the fourth node. This corresponds to the situation which would occur if a new message was exchanged between nodes A and J in the example of FIG. 4B, where nodes A and J share a second degree neighbourhood interaction through nodes X1, X2 and either or both of E and F).

It will be appreciated that a second degree mutual interaction between nodes 5010 and 5016, while indicative of a degree of mutual interaction, presents a less strong tie between nodes 5010 and 5016 than would be provided by a direct interaction or a first degree mutual interaction. However, a large number of second degree mutual interactions may be indicative of the fact that a new message between two nodes which have not previously interacted (such as nodes 5010 and 5016) is a lower risk new message (being of less interest and/or less likelihood of being associated with illicit activity (such as an account takeover or the like)).

Therefore, considering higher degrees of mutual interactions between nodes (such as a second, or even third, mutual interaction), may further improve the efficiency and reliability when identifying a message of interest, as all forms of mutual interactions between nodes in the network are then accounted for.

Hence, in some examples, the determining unit 3006 may apply a weighting factor to the mutual interactions between accounts depending on the type of mutual interaction which has been identified from the messages which have previously been exchanged between nodes in the network.

Specifically, in this example, a first weighting, w1, may be applied to a direct interaction between nodes in the network. The first weighting, w1, may be the highest form of weighting because a previous direct interaction between nodes is a strong indicator that a new message exchanged between those nodes is unlikely to be a message of interest.

Furthermore, a second weighting, w2, may be applied an indirect first degree mutual interaction between nodes in the network. The first weighting, w2, may be a lower form of weighting than w1, because a previous first degree mutual interaction between nodes in the network is a good indicator that the new message exchanged between those nodes is unlikely to be a message of interest (although less strong than a direct interaction between those nodes).

Finally, in this example, a third weighting, w3, may be applied to an indirect second degree mutual interaction between nodes in the network. The second weighting, w2, may be higher than the third weighting, w3, because the indirect first degree interaction between nodes in the network is a stronger indicator that the new message exchanged between those nodes is unlikely to be a message of interest (although a collection of indirect second degree interactions between nodes should also be accounted for, as they provide a good indication that a new message is unlikely to be a message of interest).

Of course, it will be appreciated that a weighting factor may be applied by the determining unit 3006 when determining the level of mutual interactions in a number of additional situations to those illustrated in the example of FIG. 5 of the present disclosure. That is, the weighting factor is not particularly limited to a weighting factor applied only to the first and second degree of mutual interaction. Indeed, further weighting factors may be applied to higher degrees of indirect mutual interaction (although the weighting factor for each consecutive degree of indirect mutual interaction may be increasingly reduced accordingly). Furthermore, the, weighting factor may be applied in accordance with a property of the previous interaction (i.e. a property of the previous exchange of messages). In some examples, a property of the interaction may include, at least, a time of the interaction (such as how long ago the interaction between the nodes occurred), a strength of the interaction (such as the value associated with the previous message (where a higher value indicates a higher level of trust, and therefore a higher weighting factor, should be applied)), or a number of times an interaction has occurred (where repeated interactions between nodes should provide a higher weighting than a single previous interaction).

Applying a weighting factor in this manner may further improve the efficiency and reliability when identifying a message of interest, as a more accurate level of mutual interaction is determined by the determining unit 3006 (and subsequently provided to the identifying unit 3008) which more accurately reflects the historic relationships between nodes in the network.

In this manner, the determining unit 3006, determines a level of mutual interaction between nodes in a network (indicative of the existence of a historic relationship between those nodes) which can then be used by the identifying unit 3008 in order to determine whether a new exchange of messages relates to a message of interest in the network.

<Identifying Unit>

As described with reference to FIG. 2 of the present disclosure, the identifying unit 3008 is configured to identify a message as a message of interest when the message is exchanged between nodes having a level of mutual interaction below a predetermined threshold.

The identifying unit 3008 receives, either directly or indirectly, the level of mutual interaction between nodes which has been determined by the determining unit 3006. In some examples, the level of mutual interaction may be received for each combination (or pair) of nodes in the network. That is, in the case of three nodes A, B and C, the level of mutual interaction between nodes A and B, A and C, and B and C may be received, for example. In other examples, the level of mutual interaction may be received for the nodes which have been involved in the exchange of a new message (or a set of new messages of interest).

Consider, again, the situation described with reference to FIG. 4 of the present disclosure. Here, the example of a new message being exchanged between node X1 and node X2 is shown. In this case, the identifying unit 3008 may receive from determining unit 3006 a level of mutual interaction between nodes X1 and X2. Therefore, even though nodes X1 and X2 have directly exchanged no previous messages, a level of mutual interaction (based on the overlap of the respective interaction neighbourhood of both X1 and X2) is received which can, in turn, be used by the identifying unit 3008 in order to determine whether the new message exchanged between nodes X1 and X2 is a message of interest.

In this example, in order to determine whether the new message which has been exchanged is a message of interest, the identifying unit 3008 of apparatus 1000 is configured to compare the level of mutual interaction of nodes X1 and X2 with a predetermined threshold value. If the level of mutual interaction of nodes X1 and X2 is below this predetermined threshold value, then identifying unit 3008 is configured to identify that the message has been exchanged between two nodes which have a very low level of mutual interaction. Consequently, the message which has been exchanged will be considered as an unusual, or higher risk, message and will therefore be identified as a message of interest by the identifying unit 3008.

In the case of a banking network, for example, a mutual interaction with a third account can be a strong indicator that a new message between a first and second account is legitimate, even when the first and second account have not had any direct interaction with each other in the past. A mutual interaction with a third account may occur when a first person transfers funds to a mutual friend shared with a second person, even though they have not transferred funds directly to that mutual friend before. That is, if the first person and the second person have a strong connection, and the second person has transferred funds to the mutual friend in the past, then a new transfer from the first person to the mutual friend is very unlikely to be related to a high risk transaction (such as a fraudulent transaction or the like).

In contrast, a fraudulent (or potentially fraudulent transaction) most often does not exhibit any historic exchange of messages (or, in other words, exhibits a very low level of mutual interaction). Indeed, a historic transaction usually relates to an exchange of messages between two accounts which neither have a direct relationship nor which have a mutual interaction (being a common interaction with a third account). Therefore, the strength of the mutual interactions between two accounts (based on previous exchange of messages) can be used in order to identify messages of interest in a series of messages exchanged between nodes in a network.

It will be appreciated that the specific value that the predetermined threshold value is set to is not particularly limited in accordance with the present disclosure. Rather, the predetermined threshold value will vary depending on the situation which the present disclosure is applied to. Indeed, in situations with a large network of nodes (where the chance of a random mutual interaction is higher) the threshold level may be set to a first, lower, value in order than only the most suspicious messages are identified by the identifying unit. However, in other examples, where there is a lower chance of random mutual interactions for example, the predetermined threshold value should be set to a higher value (as legitimate messages will have a high level of mutual interaction). Therefore, for any given situation, the level of the predetermined threshold should be set in order that messages of interest are identified within the network without causing a high number of legitimate messages to be identified as messages of interest (being considered as potentially fraudulent messages, for example).

Indeed, the predetermined threshold value may be set at an initial value and then dynamically adjusted in accordance with performance of the system in identification of messages of interest. Furthermore, the predetermined threshold value may be determined during an initial calibration phase on a known set of training messages.

In some examples, the predetermined threshold value may be set such that a message between nodes with at least one of a single direct interaction, and/or two first degree mutual interactions, and/or at least four second degree mutual interactions are considered to be low interest messages (where messages having fewer than these mutual interactions will be considered as messages of interest). However, the present disclosure is not limited to this specific example.

Furthermore, in some examples, the predetermined threshold may be adjusted in accordance with a property of the message which is being identified. That is, for example, it may be important (in some example situations) to apply a stricter threshold to the identification of messages of interest in accordance with a property of the message for which it is being determined whether the message is a message of interest. In the example of a banking network, this may include applying a higher threshold value when determining whether a new, high value, transaction is a message of interest. That is, as the new transaction is higher value, it may be necessary to apply an even higher threshold such that it is ensured that the transaction is not a message of interest. As such, the predetermined threshold may, in examples, be increased in accordance with a value associated with the message. This may improve the efficiency of the identification unit when determining whether certain higher risk transactions (being of higher value) should be considered as messages of interest, for example. However, the present disclosure is not particularly limited in this regard, and other properties of the message being identified may be used in order to dynamically adjust the level of the predetermined threshold in accordance with embodiments of the disclosure.

Once the identifying unit has determined that a message (or set of messages) from amongst the messages exchanged in the network are messages of interest (having a level of mutual interaction below the predetermined threshold level), there are a number of actions which the identification unit may take depending on the situation.

In some examples, the identifying unit 3008 of apparatus 1000 may be further configured to generate an indication that a message has been identified as a message of interest. The indication may comprise a warning message, a flag, and/or a notification which alerts an operator of the apparatus (or an interested party, such as an investigator) that a message has been identified as a message of interest. Such an indication may also be provided to an external computing device/or server which is configured to perform certain additional processing on messages which have been identified as messages of interest (in order to determine whether a potentially fraudulent transaction is actually a fraudulent transaction, for example). This enables computationally demanding additional processing to be restricted to a small subset of all the messages which have been exchanged in the network (being only the subset of messages which have been identified as messages of interest) thus improving the efficiency of the system when investigating instances of fraud in a network (or other illicit activity).

Furthermore, in some examples, it may be advantageous if certain additional information regarding the message which has been identified as a message of interest is provided with the indication generated by the identifying unit 3008 of apparatus 1000. That is, the indication that the message has been identified as a message of interest may, in some examples, include at least one of information regarding the message (such as a unique message identifier, a value associated with the message and/or a time at which the message was exchanged, for example), information regarding the nodes between which the message was exchanged (including, for example, unique identifiers of the nodes), and/or the level of mutual interaction (being the value of the mutual interaction which has been determined by the determining unit, for example). This additional information may further facilitate rapid additional analysis and/or investigation of the message (or messages) which has (or have) been identified as a message of interest.

Furthermore, the identifying unit 3008 may maintain a record of all the messages which have been identified as a message of interest (held in a secure storage unit internal or external to apparatus 1000).

It will be appreciated that, in some examples, it may be advantageous if the identifying unit 3008 takes one or more further actions once a message has been identified as a message of interest before further investigation into the message of interest has been performed. Consider the example described with reference to FIG. 2 of the present disclosure (being the example of messages (transactions) between nodes (accounts) in a banking network). In this example, a fraudster 2014 has gained unauthorised access to a victim's account (being Acc 3 belonging to victim 2012). Once access has been gained, the fraudster may initiate a new transaction to transfer funds away from the victim's account (into a secure holding account, from which the funds can later be retrieved, for example). Here, in this example, the identifying unit 3008 identifies the transaction being performed by the fraudster as a message (or transaction) of interest, as the fraudster attempts to transfer the funds into an account which has a very low level of mutual interaction with the victim's account. However, if the transaction is allowed to take place, the fraudster may then very quickly distribute the funds across the network before further investigation into the transaction can be performed. This can make it very difficult and computationally challenging to recover the funds which have been stolen from the victim's account. Accordingly, in some examples, it may be advantageous that the identifying unit 3008 of apparatus 1000 performs further actions when the transaction has been identified as a message of interest (including, for example, blocking the transaction which has been identified as a transaction of interest before that transaction can be completed). This further improves security and reduces the likelihood that funds will be lost to fraudulent activity.

Hence, more generally, in some examples, a new exchange of messages between nodes may be blocked (or otherwise prevented from being completed) when the message is exchanged between nodes having a level of mutual interaction below a predetermined threshold.

Of course, in these examples, if subsequent analysis shows that the message of interest is a legitimate message (despite the fact that it occurs between nodes having a very low level of previous mutual interaction) then the message, which has been blocked, can be released.

In this manner, a message of interest amongst the messages which have been exchanged between nodes in the network can be identified.

<Advantageous Technical Effects>

According to embodiments of the disclosure, a message of interest exchanged in a network of nodes can be efficiently and reliably detected. In particular, fraudulent, or potentially fraudulent messages exchanged within the network can be identified from amongst a stream of messages exchanged within the network. This enables a significant reduction in the number of messages which must be further investigated in order to identify fraudulent activity. In particular, computationally expensive processing required to investigate instances of potential fraud can be performed only on messages which have been identified as messages of interest from amongst the messages exchanged within the network. This leads to improvements in processing efficiency when detecting fraudulent activity and fraudulent nodes in a network.

Of course, the present disclosure is not particularly limited to the above-identified distinguishing technical features of the claimed invention.

<Method>

Figure 6:
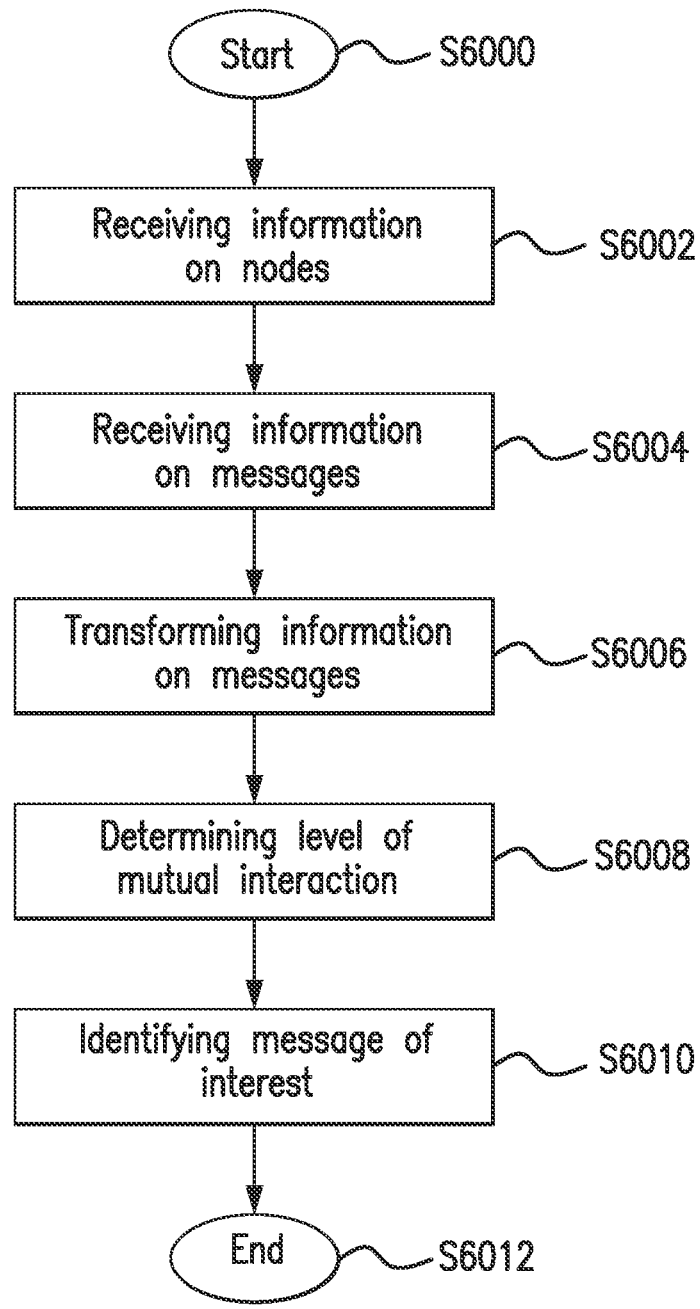
FIG. 6 illustrates a method in accordance with embodiments of the disclosure.

Furthermore, a method of identifying a message of interest exchanged between nodes in a network is provided by embodiments of the disclosure. FIG. 6 illustrates an example method in accordance with embodiments of the disclosure.

The example method of FIG. 6 starts at step S6000 and proceeds to step S6002.

In step S6002, the method comprises receiving information of nodes in a network, the information including at least a unique identifier of each node.

Then, the method proceeds to step S6004.

In step S6004, the method comprises receiving information of messages which have been exchanged between the nodes, the information comprising at least the unique identifier of the nodes related to each exchange of messages.

In step S6006, the method comprises transforming, for each node, the information of messages which have been exchanged into an individual set of interactions comprising the unique identifiers of nodes the node has exchanged messages with. In examples (such as where the nodes relate to accounts in the banking network) other accounts in the network an account may have exchanged messages with include accounts to which payments have been sent and/or from which payments have been received.

Then, in step S6008, the method comprises determining a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node.

Once the level of mutual interaction between nodes has been determined, the method comprises identifying, in step S6010, a message as a message of interest when the message is exchanged between nodes having a level of mutual interaction below a predetermined threshold.

The method then proceeds to, and ends with, step S6012.

In addition, certain embodiments of the disclosure may be arranged in accordance with the following numbered clauses:

1. Apparatus for identifying a message of interest exchanged between nodes in a network, the apparatus comprising circuitry configured to:
receive information of nodes in a network, the information including at least a unique identifier of each node;
receive information of messages which have been exchanged between the nodes, the information comprising at least the unique identifier of the nodes related to each exchange of messages;
for each node, transform the information of messages which have been exchanged into an individual set of interactions comprising the unique identifiers of nodes the node has exchanged messages with;
determine a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and
identify a message as a message of interest when the message is exchanged between nodes having a level of mutual interaction below a predetermined threshold.

2. The apparatus according to Clause 1, wherein the nodes are accounts and wherein the apparatus is configured to receive information including an account number and/or sort code as the unique identifier of each node.

3. The apparatus according to Clause 1 or 2, wherein the apparatus is configured to receive information of messages which have been exchanged between the nodes further comprising at least a time of each exchange of messages and/or a value associated with each exchange of messages.

4. The apparatus according to any preceding Clause, wherein the level of mutual interaction between a first and second node in the network increases as the number of mutual interactions the first node has with the second node increases.

5. The apparatus according to any preceding Clause, wherein the apparatus is further configured to generate an indication that a message has been identified as a message of interest.

6. The apparatus according to Clause 5, wherein the indication that the message has been identified as a message of interest includes at least one of information regarding the message, the nodes between which the message was exchanged, and/or the level of mutual interaction.

7. The apparatus according to any preceding Clause, wherein the apparatus is configured to determine a level of mutual interaction between nodes in the network using the individual set of interactions of each node, wherein the first node has a mutual interaction with the second node when the unique identifier of a fourth node is contained in the individual set of interactions of the first node, a fifth node is contained in the individual set of interactions of the second node, and the unique identifier of the fifth node is contained in the individual set of interactions of the fourth node.

8. The apparatus according to any preceding Clause, wherein a weighting is applied to each mutual interaction between the first and second node in accordance with a property of the interaction.

9. The apparatus according to Clause 8, wherein a property of the interaction includes at least a time of the interaction; a strength of the interaction and/or a degree of the interaction.

10. The apparatus according to any preceding Clause, wherein the predetermined threshold is adjusted in accordance with a property of the message which is being identified.

11. The apparatus according to Clause 10, wherein the predetermined threshold is increased in accordance with a value associated with the message.

12. The apparatus according to any preceding Clause, wherein a new exchange of messages between nodes is blocked when the message is exchanged between nodes having a level of mutual interaction below a predetermined threshold.

13. The apparatus according to any preceding Clause, wherein the nodes are accounts and wherein an exchange of messages includes a transaction transferring funds into or out of the account.

14. Method of identifying a message of interest exchanged between nodes in a network, the method comprising:
receiving, using circuitry, information of nodes in a network, the information including at least a unique identifier of each node;
receiving, using circuitry, information of messages which have been exchanged between the nodes, the information comprising at least the unique identifier of the nodes related to each exchange of messages;
for each node, transforming, using circuitry, the information of messages which have been exchanged into an individual set of interactions comprising the unique identifiers of nodes the node has exchanged messages with;
determining, using circuitry, a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and
identifying, using circuitry, a message as a message of interest when the message is exchanged between nodes having a level of mutual interaction below a predetermined threshold.

15. Computer program product comprising computer readable instructions which, when the instructions are implemented by a computer, cause the computer to perform a method of identifying a message of interest exchanged between nodes in a network, the method comprising:

receiving information of nodes in a network, the information including at least a unique identifier of each node;

receiving information of messages which have been exchanged between the nodes, the information comprising at least the unique identifier of the nodes related to each exchange of messages;

for each node, transforming the information of messages which have been exchanged into an individual set of interactions comprising the unique identifiers of nodes the node has exchanged messages with;

determining a level of mutual interaction between nodes in the network using the individual set of interactions of each node, wherein a first node has a mutual interaction with a second node when the unique identifier of the second node is contained in the individual set of interactions of the first node and/or the unique identifier of a third node is contained in the individual set of interactions of each of the first and second node; and identifying a message as a message of interest when the message is exchanged between nodes having a level of mutual interaction below a predetermined threshold.

It will further be appreciated that while examples of the present disclosure have been described with reference to the specific example of detecting messages of interest in a situation such as that illustrated in FIG. 2 of the present disclosure (i.e. a banking network or the like) the present disclosure is not particularly limited in this regard. That is, embodiments of the present disclosure may also be applied to the identification of messages of interest in any suitable network of nodes as desired. For example, in embodiments of the present disclosure may be applied to the detection of messages of interest sent using a messaging service such as an email account or the like. Moreover, embodiments of the present disclosure may also be used in order to detect illicit activity in social media accounts or the like. Indeed, the present disclosure is not particularly limited to these further examples. In fact, it will be understood that technical effects including an increased processing efficiency in the detection of messages of interest may be achieved by embodiments of the disclosure regardless of the specific type of node (or the type of network) to which the embodiments of the disclosure are applied.

While numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. Apparatus for identifying a message of interest exchanged between nodes in a network, the apparatus comprising circuitry configured to:

receive information of a plurality of nodes in the network, the information including a unique identifier of each respective node;

receive information of a plurality of messages which have been exchanged between the plurality of nodes, for each respective message, the information comprising the unique identifier of each respective node related to the exchange of the respective message;

for each respective node, transform the information of the plurality of messages into an individual set of interactions comprising the unique identifiers of the plurality of nodes the respective node has exchanged messages with;

determine a level of mutual interaction between the plurality of nodes in the network using the individual set of interactions of each respective node, wherein a first node has a direct mutual interaction with a second node when the unique identifier of the second node is contained in the individual set of interactions of the first node, an indirect first degree mutual interaction when the unique identifier of a third node is contained in the individual set of interactions of each of the first and second node, and an indirect second degree mutual interaction when the unique identifier of a fourth node is contained in the individual set of interactions of the first node, the unique identifier of a fifth node is contained in the individual set of interactions of the second node, and the unique identifier of the fifth node is contained in the individual set of interactions of the fourth node;

receive information of a new message exchanged between the first node and the second node;

compare the level of mutual interaction between the first node and the second node to a predetermined threshold, wherein the predetermined threshold is a weighted combination of a number of direct mutual interactions, a number of indirect first degree mutual interactions, and a number of indirect second degree mutual interactions, wherein the number of indirect second degree mutual interactions is greater than the number of indirect first degree mutual interactions, and wherein the number of indirect first degree mutual interactions is greater than the number of direct mutual interactions; and based on the level of mutual interaction being below the predetermined threshold, identify the new message as a message of interest.

2. The apparatus according to claim 1, wherein the plurality of nodes are accounts and wherein the apparatus is configured to receive information including an account number and/or sort code as the unique identifier of each respective node.

3. The apparatus according to claim 1, wherein information of the plurality of messages further comprises one or more of the following: a time of each exchange of the plurality of messages and a value associated with each exchange of the plurality of messages.

4. The apparatus according to claim 1, wherein the level of mutual interaction between a first and second node in the network increases as the number of mutual interactions the first node has with the second node increases.

5. The apparatus according to claim 1, wherein the apparatus is further configured to generate an indication that the new message has been identified as a message of interest.

6. The apparatus according to claim 5, wherein the indication that the new message has been identified as the message of interest includes one or more of the following: information regarding the new message, the first and second nodes between which the new message was exchanged, and the level of mutual interaction.

7. The apparatus according to claim 1, wherein a weighting is applied to each mutual interaction between the first and second node in accordance with a property of the interaction.

8. The apparatus according to claim 7, wherein a property of the interaction includes one or more of the following: a time of the interaction; a strength of the interaction; and a degree of the interaction.

9. The apparatus according to claim 1, wherein the predetermined threshold is adjusted in accordance with a property of the new message.

10. The apparatus according to claim 9, wherein the predetermined threshold is increased in accordance with a value associated with the new message.

11. The apparatus according to claim 1, wherein a new exchange of messages between the first and second nodes is blocked when the new message is identified as the message of interest.

12. The apparatus according to claim 1, wherein the plurality of nodes are accounts and wherein the new message includes a transaction transferring funds into or out of an account.

13. Method of identifying a message of interest exchanged between nodes in a network, the method comprising:
receiving, using circuitry, information of a plurality of nodes in the network, the information including a unique identifier of each respective node;
receiving, using the circuitry, information of a plurality of messages which have been exchanged between the plurality of nodes, for each respective message, the information comprising the unique identifier of each respective node related to the exchange of the respective message;
for each respective node, transforming, using the circuitry, the information of the plurality of messages into an individual set of interactions comprising the unique identifiers of the plurality of nodes the respective node has exchanged messages with;
determining, using the circuitry, a level of mutual interaction between the plurality of nodes in the network using the individual set of interactions of each respective node, wherein a first node has a direct mutual interaction with a second node when the unique identifier of the second node is contained in the individual set of interactions of the first node, an indirect first degree mutual interaction when the unique identifier of a third node is contained in the individual set of interactions of each of the first and second node, and an indirect second degree mutual interaction when the unique identifier of a fourth node is contained in the individual set of interactions of the first node, the unique identifier of a fifth node is contained in the individual set of interactions of the second node, and the unique identifier of the fifth node is contained in the individual set of interactions of the fourth node;
receiving, by the circuitry, information of a new message exchanged between the first node and the second node;
comparing, using the circuitry, the level of mutual interaction between the first node and the second node to a predetermined threshold, wherein the predetermined threshold is a weighted combination of a number of direct mutual interactions, a number of indirect first degree mutual interactions, and a number of indirect second degree mutual interactions, wherein the number of indirect second degree mutual interactions is greater than the number of indirect first degree mutual interactions, and wherein the number of indirect first degree mutual interactions is greater than the number of direct mutual interactions; and
based on the level of mutual interaction being below the predetermined threshold, identifying, using the circuitry, the new message as a message of interest.

14. The method according to claim 13, wherein the method includes generating an indication that the new message has been identified as the message of interest, and
wherein the indication that the new message has been identified as the message of interest includes one or more of the following: information regarding the new message, the first and second nodes between which the new message was exchanged, and the level of mutual interaction.

15. The method according to claim 13, wherein a weighting is applied to each mutual interaction between the first and second node in accordance with a property of the interaction, and
wherein a property of the interaction includes one or more of the following: a time of the interaction; a strength of the interaction; and a degree of the interaction.

16. The method according to claim 13, wherein the predetermined threshold is adjusted in accordance with a property of the new message, and
wherein the predetermined threshold is increased in accordance with a value associated with the new message.

17. A non-transitory computer readable storage medium comprising computer readable instructions which, when the instructions are implemented by a computer, cause the computer to perform operations comprising:
receiving information of a plurality of nodes in the network, the information including a unique identifier of each respective node;
receiving information of a plurality of messages which have been exchanged between the plurality of nodes, for each respective message, the information comprising the unique identifier of each respective node related to the exchange of the respective message;
for each respective node, transforming the information of the plurality of messages into an individual set of interactions comprising the unique identifiers of the plurality of nodes the respective node has exchanged messages with;

determining a level of mutual interaction between the plurality of nodes in the network using the individual set of interactions of each respective node, wherein a first node has a direct mutual interaction with a second node when the unique identifier of the second node is contained in the individual set of interactions of the first node, an indirect first degree mutual interaction when the unique identifier of a third node is contained in the individual set of interactions of each of the first and second node, and an indirect second degree mutual interaction when the unique identifier of a fourth node is contained in the individual set of interactions of the first node, the unique identifier of a fifth node is contained in the individual set of interactions of the second node, and the unique identifier of the fifth node is contained in the individual set of interactions of the fourth node;

receiving information of a new message exchanged between the first node and the second node;

comparing, using the circuitry, the level of mutual interaction between the first node and the second node to a predetermined threshold, wherein the predetermined threshold is a weighted combination of a number of direct mutual interactions, a number of indirect first degree mutual interactions, and a number of indirect second degree mutual interactions, wherein the number of indirect second degree mutual interactions is greater than the number of indirect first degree mutual interactions, and wherein the number of indirect first degree mutual interactions is greater than the number of direct mutual interactions; and based on the level of mutual interaction being below the predetermined threshold, identifying the new message as a message of interest.

18. The non-transitory computer readable storage medium according to claim 17, wherein the computer readable instructions further cause the computer to perform the operations of:

generating an indication that the new message has been identified as the message of interest; and wherein the indication that the new message has been identified as the message of interest includes one or more of the following: information regarding the new message, the first and second nodes between which the new message was exchanged, and the level of mutual interaction.

19. The non-transitory computer readable storage medium according to claim 17, wherein a weighting is applied to each mutual interaction between the first and second node in accordance with a property of the interaction; and wherein a property of the interaction includes one or more of the following: a time of the interaction; a strength of the interaction; and a degree of the interaction.

* * * * *